(12) United States Patent
Whitney

(10) Patent No.: US 7,146,306 B2
(45) Date of Patent: Dec. 5, 2006

(54) HANDHELD COMPUTER CONSOLE EMULATION MODULE AND METHOD OF MANAGING A LOGICALLY-PARTITIONED MULTI-USER COMPUTER WITH SAME

(75) Inventor: Kristopher Craig Whitney, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 10/020,601

(22) Filed: Dec. 14, 2001

(65) Prior Publication Data

US 2003/0115442 A1    Jun. 19, 2003

(51) Int. Cl.
*G06F 9/455* (2006.01)
(52) U.S. Cl. .................................. 703/24; 439/676
(58) Field of Classification Search ............... 703/24; 709/220; 439/676
See application file for complete search history.

(56) References Cited

U.S. PATENT DOCUMENTS

| | | | |
|---|---|---|---|
| 5,875,350 A * | 2/1999 | Comp et al. ................... | 710/11 |
| 6,145,069 A * | 11/2000 | Dye ............................. | 711/170 |
| 6,279,046 B1 * | 8/2001 | Armstrong et al. ............ | 710/5 |
| 6,353,870 B1 * | 3/2002 | Mills et al. ................... | 710/301 |
| 6,633,916 B1 * | 10/2003 | Kauffman ..................... | 709/229 |
| 6,732,067 B1 * | 5/2004 | Powderly ...................... | 703/24 |
| 6,892,383 B1 * | 5/2005 | Arndt ............................ | 718/1 |
| 2001/0000161 A1 * | 4/2001 | Laity ........................... | 439/676 |

OTHER PUBLICATIONS

"Development kit for Handspring Handheld Computers Release 1.0", 1999, Handspring.*

Mocha Pocket TN5250 (Document provided by applicant on the Information Disclosure Statement, item B.S).*

Don Anderson, "PCMCIA system architecture: 16-bit cards", 1995, Addison-Wesley Publishing Company.*

Stephen Okay and Gale Pedowitz, "GEORDI: A Handheld Tool For Remote System Administration", Dec. 7, 2001, Proceedings of the LISA 2001 15th System Administration Conference.*

Xircom CompactCard Modem 56 GlobalACCESS™ Product Literature (at least as early as Dec. 2001), 2 pages.

Xircom CompactCard Ethernet 10 Product Literature (at least as early as Dec. 2001), 3 pages.

(Continued)

*Primary Examiner*—Paul Rodriguez
*Assistant Examiner*—Russ Guill
(74) *Attorney, Agent, or Firm*—Wood, Herron & Evans, LLP

(57) ABSTRACT

A computer system and method of managing a logical partition on a logically-partitioned multi-user computer utilize a handheld computer with a plug-in console emulation module to emulate a console through which various system administrations operations may be performed. The handheld computer is coupled to an adapter on a logically-partitioned computer via a plug-in module coupled to the handheld computer and connected to the adapter via a cable. The handheld computer is configured to emulate a console for a logical partition in the partitioned computer using program code resident in the plug-in module. The plug-in module may incorporate a network interface configured to receive a network connector, a memory, and program code resident in the memory and configured to control the handheld computer to perform the desired console emulation. As such, by incorporating both the console emulation program code and the network interface in the same module, a relatively compact, portable, cost-effective and easy-to-use mechanism for performing system administration operations on a multi-user computer may be provided.

22 Claims, 3 Drawing Sheets

OTHER PUBLICATIONS

Xircom SpringPort™ Access Solution for Handspring Visor™ handheld PCs Product Literature (at least as early as Dec. 2001), 3 pages.

"Card Access Introduces Tiny, Battery-Less, Combination 56K Modem/Memory Springboard™ Module for the Handspring™ Visor™ ", Card Access Press Release (Mar. 20, 2001), 2 pages.

*Online 1.6d3 Product Literature*, Downloaded from PalmGear.com (at least as early as Jul. 15, 2001), 5 pages.

"PowerTerm® CE—Powerful host system in the palm of your hand", *Ericom Product Literature*, (May 2000), 2 pages.

"Soft Solutions We Find it . . . Fast!", *Ericom Product Literature*, (Jun. 28, 2001), 2 pages.

* cited by examiner

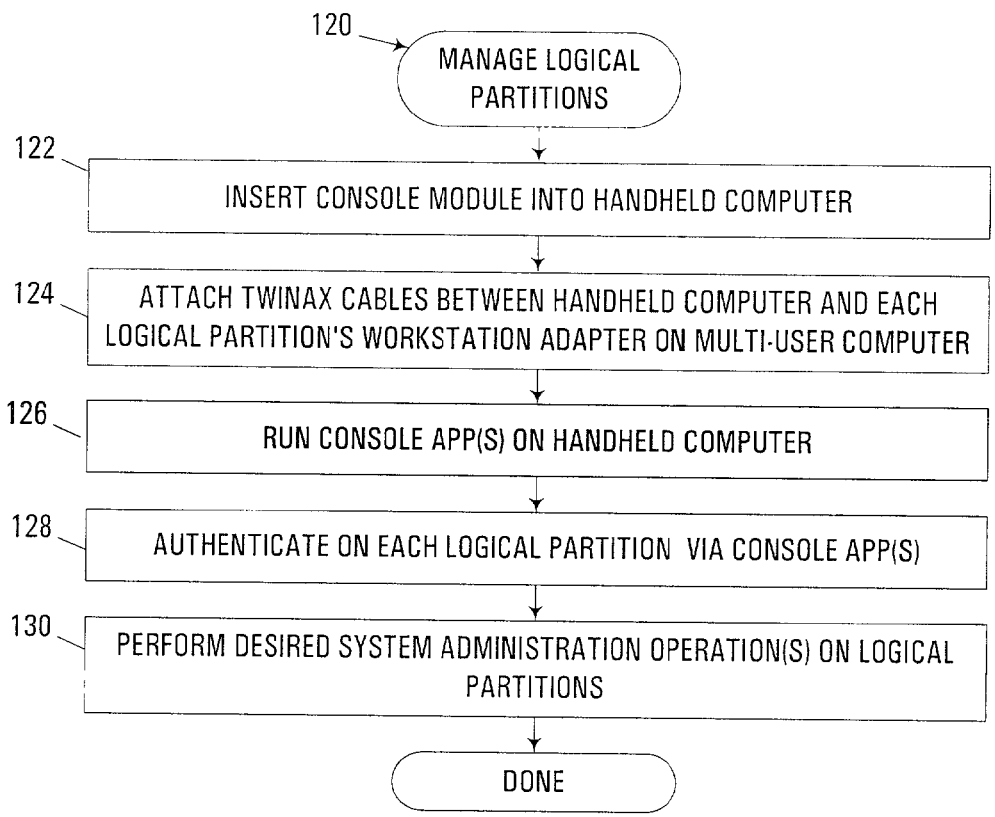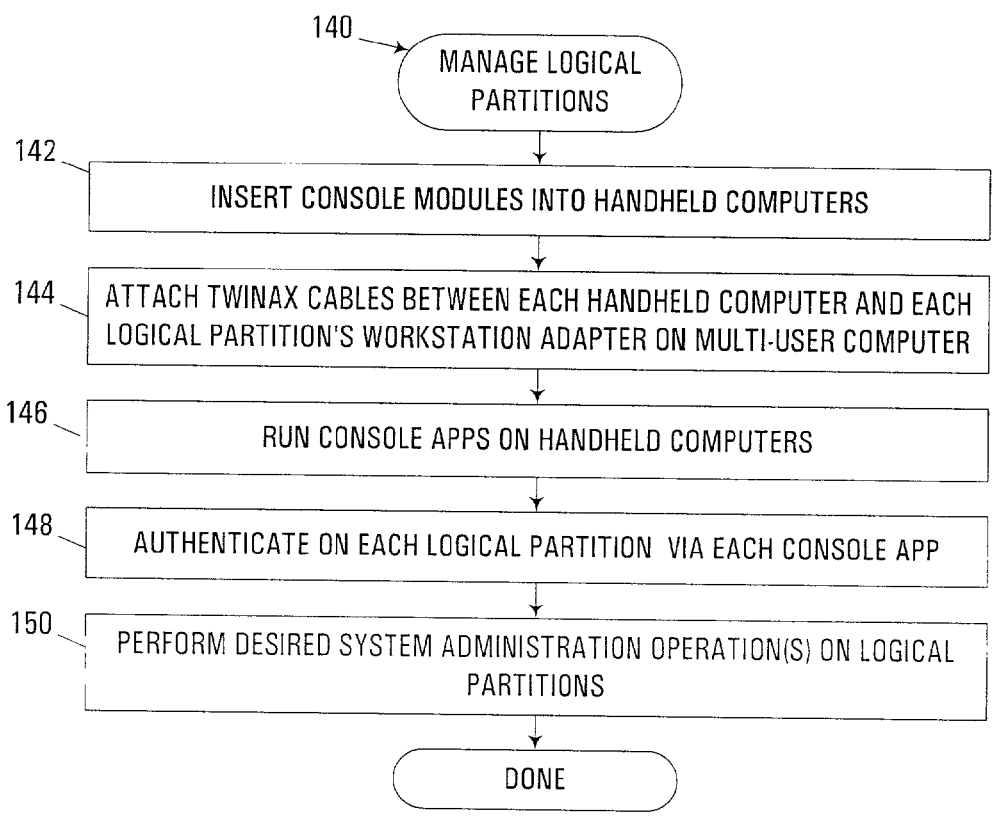

HANDHELD COMPUTER CONSOLE EMULATION MODULE AND METHOD OF MANAGING A LOGICALLY-PARTITIONED MULTI-USER COMPUTER WITH SAME

FIELD OF THE INVENTION

The invention is generally related to the management of multi-user computers, and in particular, to the management of logically-partitioned multi-user computers.

BACKGROUND OF THE INVENTION

Computer technology continues to advance at a rapid pace, with significant developments being made in both software and in the underlying hardware upon which such software executes. One significant advance in computer technology is the development of multi-processor computers, where multiple computer processors are interfaced with one another to permit multiple operations to be performed concurrently, thus improving the overall performance of such computers. Also, a number of multi-processor computer designs rely on logical partitioning to allocate computer resources to further enhance the performance of multiple concurrent tasks.

With logical partitioning, a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

A shared resource, often referred to as a "hyperviser" or partition manager, manages the logical partitions and facilitates the allocation of resources to different logical partitions. For example, a partition manager may allocate resources such as workstation adapters, storage devices, memory space, network adapters, etc. to various partitions to support the relatively independent operation of each logical partition in much the same manner as a separate physical computer.

Logical partitioning, however, does raise some potential concerns for multi-user computers with respect to system administration. In particular, many multi-user computers require that various system administration operations be performed from time to time, e.g., reconfiguring a computer, installing or updating software, resetting configuration parameters, and other maintenance operations. Logically-partitioned computers may also require additional system administration operations such as managing logical partitions, reallocating system resources, etc.

To support such system administration operations, many multi-user computers require the use of a "console", typically a dedicated terminal or workstation, coupled to an input/output (I/O) adapter such as a workstation adapter. For example, an A/S 400 or eServer iSeries midrange computer from International Business Machines Corporation requires the use of a terminal or a workstation operating as a 5250-compatible console to perform system administration operations.

In many instances, however, it may not be desirable to permanently install a dedicated workstation or terminal for use with a particular multi-user computer. As an example, given that system administration operations may only be required on a relatively infrequent basis, the cost and space required to provide a dedicated terminal may not be justified. Moreover, given that a dedicated terminal provides a point of entry or access for a multi-user computer, and thus a potential security or hacking risk, it may be desirable for security reasons to disconnect any dedicated terminals from a multi-user computer the majority of the time.

Logical partitioning builds on the above concerns based upon the fact that, in many environments, separate terminals are required for each logical partition since the adapters through which system administration operations are performed on a logically-partitioned computer are generally not shareable by multiple logical partitions. Put another way, each logical partition requires its own dedicated adapter, and hence its own dedicated terminal or workstation. As a result, if permanently-connected consoles are to be supplied, a relatively large number of dedicated workstations or terminals must be installed at a given computer installation to support the system administration requirements of multiple logical partitions. Given that workstations and terminals can be expensive, can occupy space in crowded computer installations, and can increase power consumption and cooling demands, simply dedicating multiple workstations or terminals to perform the relatively infrequent system administration operations on a logically-partitioned computer is often unjustifiably wasteful.

In the alternative, a single workstation or terminal may be manually disconnected and connected from and to various adapters to perform system administration operations on multiple logical partitions. However, in some instances it may be desirable to access multiple logical partitions at the same time, e.g., for concurrent maintenance operations, as well as cross-partition servicing. In some environments, for example, access to a primary logical partition may be required even if system administration operations are principally being performed on a secondary partition. With a single terminal or workstation, however, concurrent access to multiple logical partitions cannot be obtained.

Given the numerous drawbacks associated with leaving dedicated terminals or workstations coupled to a multi-user computer, many customers forego such dedicated workstations or terminals altogether. However, doing so requires that service personnel bring along suitable computing devices for accessing multi-user computers when supporting or maintaining those computers. Such devices, however, are relatively bulky and burdensome to move from installation to installation.

Computer technology has advanced at a rapid pace, and is currently at the point where many of the tasks that once required complex and expensive computers can now be performed on relatively inexpensive and compact devices. For example, handheld computers such as Personal Digital Assistants (PDA's) are now utilized to perform a wide variety of computing tasks, including emulating the terminals that are conventionally used to access multi-user computers.

Furthermore, many handheld computers incorporate various types of network interfaces to support the connection of such devices to various types of wired or wireless networks. For example, some handheld computers support modems or ethernet connectors that facilitate connecting to phone lines or local area networks. By using these connectors in connection with console emulation software, such handheld computers are capable of connecting to multi-user computers. In many instances, however, the console emulation software is developed and maintained by a separate entity from the handheld computer manufacturer and/or the manufacturer of the interface hardware through which a handheld computer is interfaced with an external computer. It is therefore typically the responsibility of a user to obtain the appropriate hardware and software from multiple vendors to properly configure a handheld computer to access a multi-user computer.

Some handheld computers also incorporate a modular design through which external peripherals can be physically connected to a handheld computer to provide additional functionality. For example, Handspring, Inc. of Mountain View, Calif. offers a number of handheld computer designs such as the Visor line of PDA's that incorporate Springboard expansion ports to which compatible modules may be installed. Some modules, for example, incorporate modems or ethernet adapters for use in configuring a compatible PDA for access to an external network. However, to date, none of these modules incorporate additional software for use in emulating a console. Rather, separate software, downloaded separately into a PDA, is typically used to implement such functionality.

It is anticipated that handheld computers such as PDA's and the like could be used to perform a number of system administration operations on multi-user computers, and potentially even assist in the management of logical partitions. To date, however, the configuration of such devices for use in performing system administration operations requires significant effort on the part of the user to acquire the appropriate hardware and software and properly configure the handheld computer. Moreover, most interfaces utilized by such devices are capable of connecting to a multi-user computer only through a shared network, rather than via a direct connection. Therefore, should a multi-user computer be inaccessible over a network due to problems in the network, or should the network stack (e.g., a TCP/IP stack) fail on the multi-user computer, a handheld computer typically could not be used to access the multi-user computer.

In view of the significant limitations of conventional multi-user computer administration tools, a significant need exists in the art for an improved manner of performing system administration operations on a multi-user computer, particularly for such a computer that incorporates logical partitioning and the additional administration concerns presented thereby. Furthermore, in view of the limitations of existing handheld computer designs, improvements to such designs are needed to facilitate the use of handheld computers in performing system administration operations on multi-user computers and the like.

SUMMARY OF THE INVENTION

The invention addresses these and other problems associated with the prior art by providing in one aspect a computer system and method of managing a logical partition on a logically-partitioned multi-user computer that utilizes a handheld computer with a plug-in console emulation module to emulate a console through which various system administrations operations may be performed.

In particular, a handheld computer is coupled to a workstation adapter on a logically-partitioned computer via a plug-in module coupled to the handheld computer and connected to the workstation adapter via a cable. The handheld computer is configured to emulate a console for a logical partition in the partitioned computer using program code resident in the plug-in module. As such, the handheld computer is able to operate much like a conventional terminal or workstation, thus facilitating management of a logical partition in a substantially more compact and portable form factor, and often eliminating the need for a dedicated, permanently-installed terminal or workstation for the multi-user computer. Particularly when a multi-user computer incorporates multiple logical partitions that are accessed via separate workstation adapters, the savings in costs and space due to the elimination of multiple dedicated workstations can be significant.

In addition, consistent with another aspect of the invention, a handheld computer and a plug-in module therefor are provided. The plug-in module includes a network interface configured to receive a network connector, a memory, and program code resident in the memory and configured to control a handheld computer to emulate a console that communicates with a multi-user computer over the network interface. Through the provision of both the console emulation program code and the network interface in the same module, a relatively compact, portable, cost-effective and easy-to-use mechanism for performing system administration operations on a multi-user computer may be provided.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 5 is a flowchart illustrating an exemplary sequence of operations utilized to manage multiple logical partitions in the multi-user computer illustrated in FIG. 1, utilizing a single handheld computer coupled to a multi-console emulation module consistent with the invention.

FIG. 6 is a flowchart illustrating another exemplary sequence of operations utilized to manage multiple logical partitions in the multi-user computer illustrated in FIG. 1, utilizing a multiple handheld computers and console emulation modules consistent with the invention.

DETAILED DESCRIPTION

The embodiments described herein utilize a plug-in console emulation module in connection with a commercially-available handheld computer to manage a multi-user computer, and in particular, to manage one or more logical partitions resident on such a computer. As will become more apparent below, however, it will be appreciated that the management of logical partitions may be facilitated through the use of a wide variety of handheld computer configurations other than that described herein, and further, that a console emulation module as described herein may be utilized to manage a wide variety of multi-user computer designs, e.g., to perform various system administration operations including but not limited to managing logical partitions, e.g., concurrent maintenance, storage management, debugging, starting/ending jobs, etc. Therefore, the invention is not limited to the particular implementations described herein.

Figure 1:
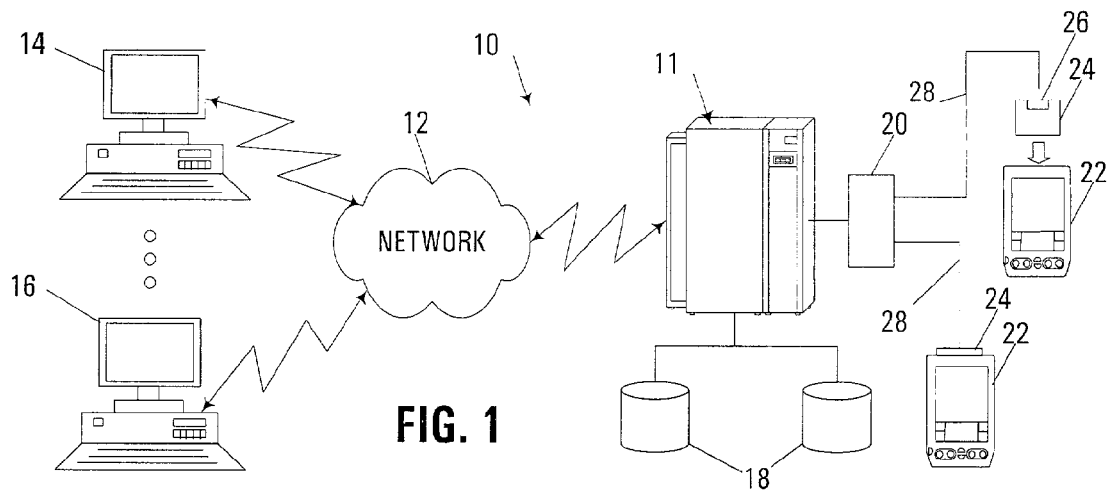
FIG. 1 is a block diagram of a networked computer system incorporating a logically-partitioned multi-user computer interconnected with a handheld computer via a console emulation module consistent with the invention.

Turning to the Drawings, wherein like numbers denote like parts throughout the several views, FIG. 1 illustrates a networked computer system 10 incorporating a multi-user computer or apparatus 11 consistent with the invention. Multi-user computer 11 generically represents, for example, any of a number of multi-user computers capable of being managed via a console application, e.g., a network server, a midrange computer, a mainframe computer, etc. Moreover, as will become more apparent below, multi-user computer 11 as illustrated is capable of supporting logical partitioning, although the hereinafter-described console emulation module may be used to manage non-partitioned multi-user computers in other embodiments. One suitable implementation of multi-user computer 11, for example, is in a midrange computer such as the AS/400 or eServer iSeries computer available from International Business Machines Corporation.

In its role as a multi-user computer, multi-user computer 11 is typically coupled to one or more end-user or client computers (e.g., desktop computers 14, 16) via one or more networks 12. Network 12 may represent practically any type and combination of networked interconnections, including but not limited to local-area, wide-area, point-to-point, wireless, and public networks (e.g., the Internet). Moreover, any number of computers and other devices may be networked through each network 12, e.g., multiple servers, storage devices, client computers, etc.

Additional hardware resources may be coupled to and/or managed by multi-user computer 11, as is well known in the art. For example, one or more storage devices 18, e.g., direct access storage devices (DASD's), storage area networks (SAN's), network addressable storage (NAS) devices, tape drives, optical storage devices, etc. may be managed by multi-user computer 11. Other resources, e.g., printers and other imaging devices, may also be managed by and coupled to multi-user computer 11, as is well known in the art.

Furthermore, multi-user computer 11 may represent multiple physical computer devices. For example, multi-user computer 11 may represent a cluster of multi-user computers, or a distributed network of computers.

To support the management of multi-user computer 11 in a manner consistent with the invention, multi-user computer 11 also includes a workstation controller or interface 20 that includes one or more workstation adapters configured to interconnect with a workstation such as a terminal or other client computer. Where multi-user computer 11 is implemented as an AS/400 or eServer iSeries computer, for example, workstation controller 20 may include one or more Twinax-compatible workstation adapters suitable for interconnection with a 5250-compatible terminal or other computer capable of operating as a 5250-compatible console. It is through the workstation interface that management of the computer, and in particular, management of logical partitions, is typically performed. In other embodiments, however, other adapters, including various alternative input/output (I/O) adapters such as TCP/IP adapters, may be utilized to access a multi-user computer to perform system administration operations consistent with the invention.

Consistent with the invention, such management may be implemented via one or more handheld computers 22, each utilizing a plug-in console emulation module 24 that incorporates a suitable interface 26 for coupling via an interconnect 28 to the workstation controller 20 of multi-user computer 11. For example, where multi-user computer 11 is implemented as an AS/400 or eServer iSeries computer (which will hereinafter collectively be referred to as an "AS/400-compatible computer"), each module 24 may include one or more Twinax-compatible twinaxial interfaces 26 for interconnection with workstation controller 20 via a twinaxial cable.

Figure 2:
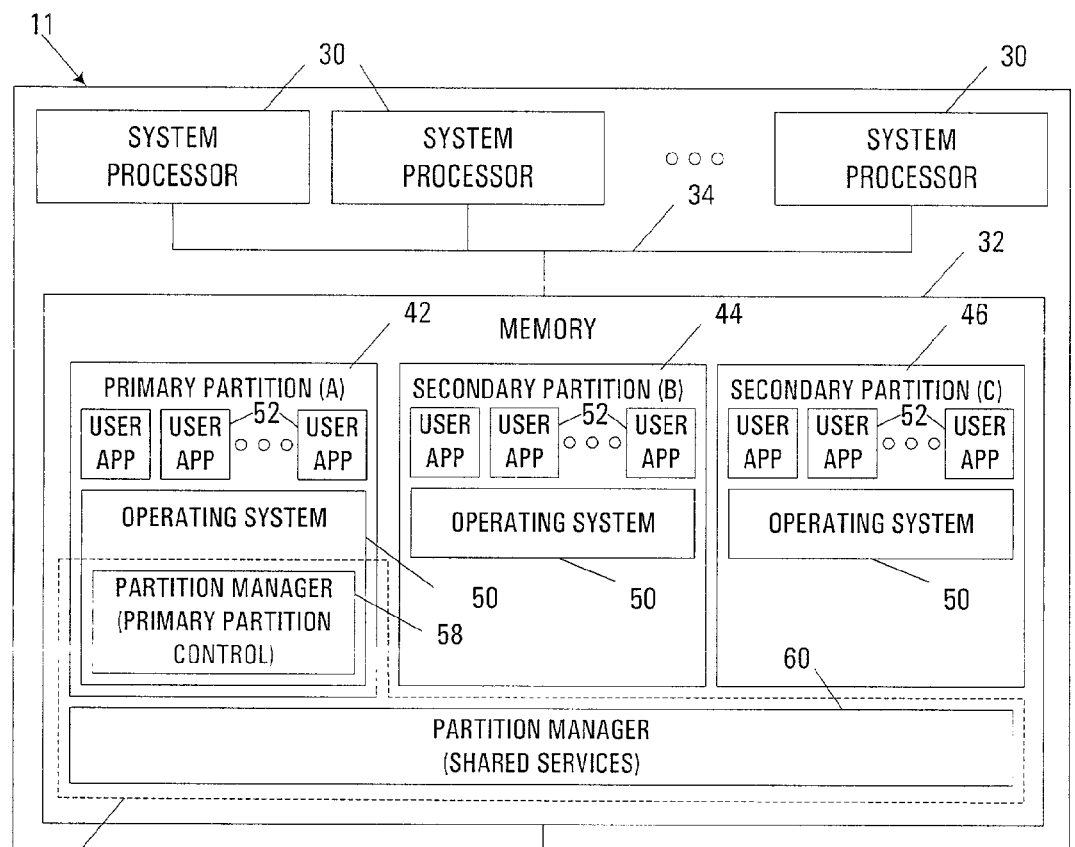
FIG. 2 is a block diagram illustrating the principal hardware and software components in the multi-user computer illustrated in FIG. 1.
Figure 2:
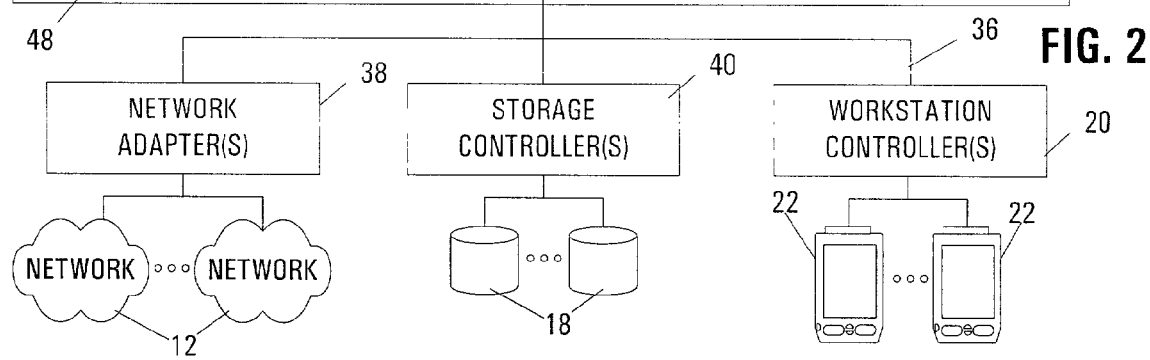

Now turning to FIG. 2, multi-user computer 11 generally includes one or more system processors 30 coupled to a memory 32 via a bus 34. Memory 32 may include one or more levels of memory devices, e.g., a DRAM-based main storage, as well as one or more levels of data, instruction and/or combination caches, with certain caches either serving individual processors or multiple processors as is well known in the art. Furthermore, memory 32 is coupled to a number of types of external devices via a bus 36, e.g., one or more network adapters 38 (for interfacing the computer with network(s) 12), one or more storage controllers 40 (for interfacing the computer with one or more storage devices 18) and one or more workstation controllers 20 (for interfacing with one or more terminals or workstations via a plurality of workstation adapters). As also illustrated in FIG. 2, suitably-configured handheld computers 22 may also be interfaced with workstation controller 20 to implement the herein-described management functionality.

FIG. 2 also illustrates in greater detail the primary software components and resources utilized in implementing a logically partitioned computing environment on multi-user computer 11, including a plurality of logical partitions 42, 44, 46 managed by a partition manager 48. Any number of logical partitions may be supported as is well known in the art.

Each logical partition utilizes an operating system 50 that controls the primary operations of the logical partition in the same manner as the operating system of a non-partitioned computer. For example, each operating system 50 may be implemented using the OS/400 operating system available from International Business Machines Corporation, residing on top of a kernel, e.g., AS/400 system licensed internal code (SLIC).

Each logical partition 42, 44, 46 executes in a separate, or independent, memory space, and thus each logical partition acts much the same as an independent, non-partitioned computer from the perspective of each user application (user app) 52 that executes in each such logical partition. As such, user applications typically do not require any special configuration for use in a partitioned environment.

In the illustrated AS/400 or eServer iSeries-based implementation, logical partition 42 operates as a primary partition, while logical partitions 44 and 46 operate as secondary partitions. A primary partition in this context shares some of the partition management functions for the computer, such as handling the powering on or powering off of the secondary logical partitions on multi-user computer 11, or initiating a memory dump of the secondary logical partitions. As such, a portion of partition manager 48 is implemented by a primary partition control block 58, disposed in the operating system 50 resident in primary partition 42. Other partition management services, which are accessible by all logical partitions, are represented by shared services block 60. However, it should be appreciated that partition management functionality need not be implemented within any particular logical partition in other implementations consistent with the invention.

Each logical partition 42, 44, 46 is also typically statically and/or dynamically allocated a portion of the available resources in multi-user computer 11. For example, each logical partition is allocated one or more processors 30, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time.

Among these additional resources capable of being allocated to a logical partition are workstation adapters in one or more workstation controllers 20. It is typically through these workstation adapters that systems administration personnel manage the multi-user computer, specifically by managing the logical partitions with which such workstation adapters are associated.

It will be appreciated that the illustration of specific resources in FIG. 2 is merely exemplary in nature, and that any combination and arrangement of resources may be allocated to any logical partition in the alternative. Moreover, it will be appreciated that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

Figure 3:
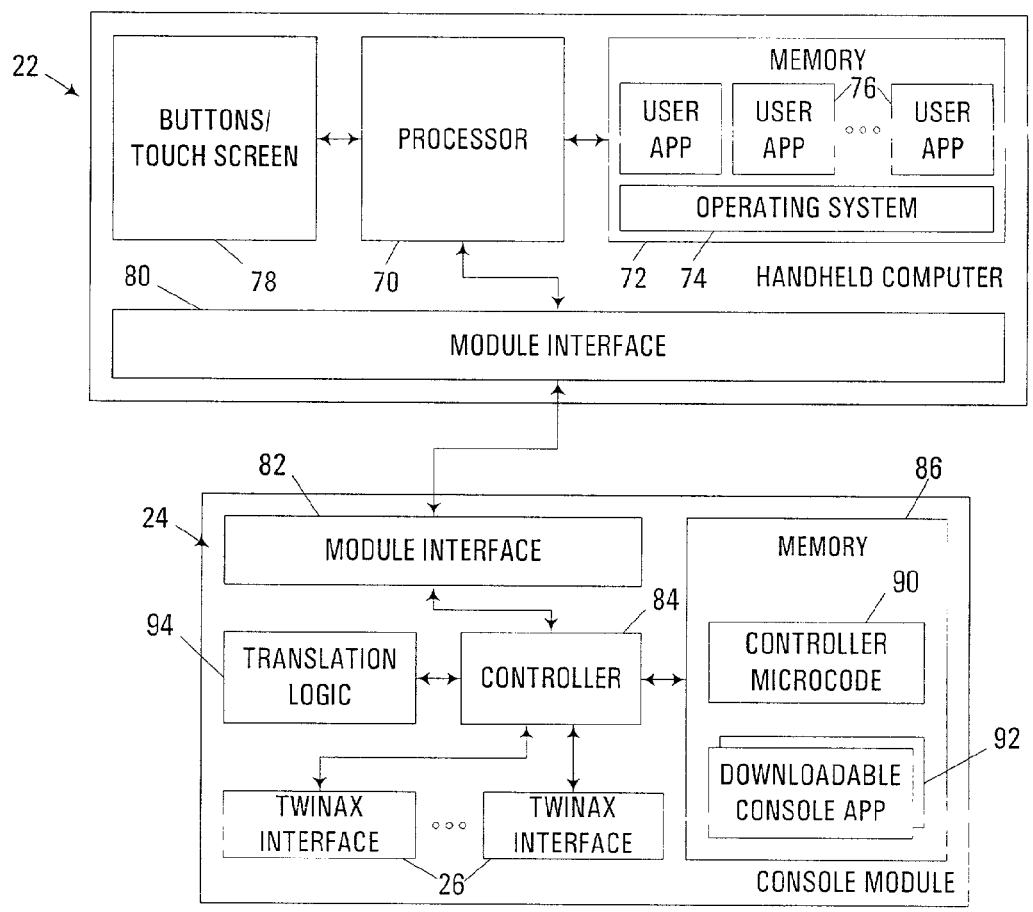
FIG. 3 is a block diagram illustrating the principal hardware and software components in one of the handheld computers and console emulation modules illustrated in FIG. 1.

FIG. 3 illustrates an exemplary handheld computer 22 and plug-in console emulation module 24 suitable for performing system administration operations consistent with the invention. Handheld computer 22 typically incorporates a processor 70 and memory 72, within which is resident an operating system 74 and one or more user applications 76. User interface is typically provided through a combination of buttons and a touch screen 78. Moreover, a module interface 80 is provided in handheld computer 22 to provide support for a plug-in module consistent with the invention.

Plug-in console emulation module 24 incorporates a compatible module interface 82 for providing electrical communication with module interface 80 of handheld computer 22. An embedded controller 84 is coupled to a memory 86 within which is stored controller microcode 90, as well as one or more downloadable console applications 92. In addition, one or more network interfaces 26, e.g., twinaxial interfaces such as Twinax-compatible interfaces may also be coupled to controller 84 to provide connection to a multi-user computer as will be described below.

Controller 84 is typically configured to pass data between handheld computer 22 and an external device coupled to any of network interfaces 26. In this regard, controller microcode 90 may incorporate translation logic to translate the data between to appropriate formats. In the alternative, separate hardware translation logic 94 may be utilized by controller 84 in some implementations.

Controller 84 is also typically configured to perform various initialization functions when module 24 is plugged in to handheld computer 22, many of which are performed by controller microcode 90. One such initialization operation is typically the download of a console application 92 to the handheld computer for execution thereby in connection with performing system administration operations consistent with the invention. In the alternative, a console application may execute directly in module 24, rather than in handheld computer 22.

Various implementations of handheld computer 22 and plug-in console emulation module 24 may be used consistent with the invention. For example, in one embodiment, handheld computer 22 may be a Visor-compatible PDA executing the Palm operation system, whereby plug-in module 24 is a Springboard-compatible module having a form factor and a module interface suitable for connection to a Springboard expansion port on handheld computer 22, the use and configuration of which is well known in the art. Moreover, downloadable console application 92 may be configured to execute using the Palm operating system.

Furthermore, in the illustrated implementation, plug-in module 24 is specifically configured for interfacing with the workstation adapter of an AS/400-compatible computer, whereby network interfaces 26 are configured as Twinax-compatible interfaces, and wherein each console application 92 is configured to emulate a 5250 terminal. As such, translation logic 94 may incorporate suitable Palm to 5250 translation logic. In the alternative, such translation may be performed by the controller, or alternatively, by the downloadable console application when resident in the handheld computer.

Various alternative implementations may be used consistent with the invention. For example, other handheld computers, such as PocketPC-compatible PDA's, other Palm-compatible PDA's, Linux-based handhelds, etc., may be used.

Furthermore, various alternative module interfaces may be utilized, e.g., Compact Flash, SmartMedia, MultiMedia Card, PC Card, Memory Stick, or other proprietary expansion interfaces may be utilized to interface a plug-in module to a handheld computer consistent with the invention. It will be appreciated that in such instances, the form factor of the module may vary to provide the appropriate mating to the particular handheld computer design to which the module is to be coupled.

Moreover, depending upon the particular type of multi-user computer to be managed, various console application implementations may be utilized, as may various translation logic and other controller functionality in a plug-in module to provide suitable communication capabilities. In addition, in some implementations, a purely proprietary solution may be utilized. However, by leveraging commercially-available handheld computer technology, it is envisioned that the cost and acceptability of a plug-in module may be better optimized.

Other hardware and software implementations of a handheld computer, plug-in console emulation module, and multi-user computer may be used in the alternative. Moreover, usage and configuration of various plug-in module designs, the software for use in connecting such modules to handheld computers, are well within the abilities of one of ordinary skill in the art having the benefit of the instant disclosure. Moreover, the suitable configuration of the hardware in a plug-in module, and the use and configuration of an appropriate console emulation application, for use in connecting and interacting with a particular multi-user computer, are also within the abilities of one of ordinary skill in the art having the benefit of the instant disclosure.

In general, the routines executed to implement the embodiments of the invention, whether implemented as part of an operating system or a specific application, agent, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1–3 is not intended to limit the present invention. Indeed, those skilled in the art will recognize that other alternative hardware and/or software environments may be used without departing from the scope of the invention.

Figure 4:
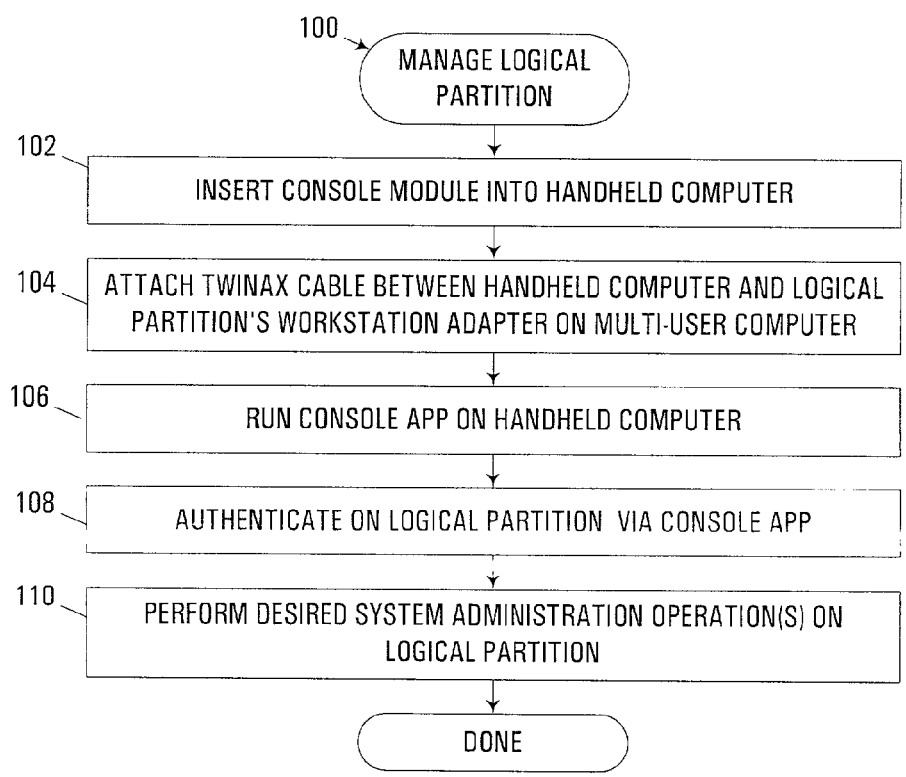
FIG. 4 is a flowchart illustrating an exemplary sequence of operations utilized to manage a logical partition in the multi-user computer illustrated in FIG. 1.

In use, the aforementioned handheld computer and plug-in console emulation module may be utilized to perform a number of system administration operations on a multi-user computer consistent with the invention. For example, as shown in FIG. 4, a logical partition in a logically-partitioned multi-user computer may be managed using the sequence of operations illustrated at 100. Typically, to manage a logical partition utilizing the aforementioned handheld computer and plug-in console emulation module, a user first inserts the console emulation module into a handheld computer as shown at block 102. Next, as shown at block 104, the user attaches a cable, e.g., a Twinax-compatible cable, between the handheld computer and logical partition workstation adapter on the multi-user computer. In the operations discussed below, it is assumed that the plug-in module is specifically configured for managing an AS/400-compatible computer incorporating logical partitioning. However, it will be appreciated that similar sequences of operations may be utilized to manage other types of logically-partitioned multi-user computers, as well as other multi-user computers that do not incorporate any form of logical partitioning.

Next, as shown in block 106, the console application is executed on the handheld computer. Such execution may be a manually-initiated operation using the primary user interface of the handheld computer, as is well known in the art. In the alternative, the console application may be automatically executed in response to insertion of the console module into the handheld computer. In addition, as discussed above, the console application is typically downloaded from the memory of the plug-in module for execution by the handheld computer. The downloading operation may occur via a manually-initiated operation, or in the alternative, may be automatically initiated in response to plugging the module into the handheld computer.

Next, once the console application is executing on the handheld computer, a user typically authenticates to the logical partition via the console application, as shown in block 108. Given that the console application is emulating a conventional terminal or workstation such as a 5250-compatible terminal, authentication occurs on the logical partition in the same manner as would occur for a dedicated terminal or workstation. In some environments, no authentication may be required, whereby block 108 may be omitted.

Next, once a user is authenticated, the user is permitted to perform various desired system administration operations on the logical partition, as shown in block 110. As above, given the emulation of a conventional console via the plug-in module, the performance of the system administration operations typically occurs in much the same manner as for a dedicated workstation or terminal, albeit through the user interface supported by the handheld computer (e.g., a keyboard and/or pen-based interface). Given the enumerable number of system operations that may be performed with a multi-user computer, and given that the use and configuration of these operations in connection with a dedicated terminal is well known in the art, a further discussion of such operations will not be provided herein, as such use and configuration would be well understood by one of the skill in the art having the benefit of the instant disclosure.

Once a user has performed the desired operations, the sequence of operations illustrated in FIG. 4 is typically complete. In connection with such operations, a user may also be required to log out from the multi-user computer, as is well known in the art, as one of the system administrations operations performed on block 110.

Using the aforementioned sequence of operations illustrated in FIG. 4, a user may be able to manage multiple logical partitions in a sequential manner, e.g., by connecting the cable to the dedicated workstation adapter for a particular logical partition, managing the logical partition as described above, disconnecting the cable and reconnecting the cable to another workstation adapter allocated to another logical partition, and managing the other logical partition in the same manner as described above. However, in some instances it may be desirable to manage multiple logical partitions concurrently, e.g., when it is desirable to perform cross-partition servicing on a multi-user computer.

FIG. 5, for example, illustrates one exemplary sequence of operations 120 suitable for managing multiple logical partitions using a console emulation module that incorporates multiple network interfaces, e.g., as shown in FIG. 3. As shown in block 122, for example, a suitably-configured plug-in console emulation module may be inserted into a handheld computer. Then, in block 124, multiple Twinax-compatible cables may be coupled between the handheld computer and each logical partition's workstation adapter on the multi-user computer, using the connectors provided for the multiple interfaces in the plug-in module.

Next, as shown in block 126, one or more console applications may be executed on the handheld computer. In some embodiments, it may be desirable to execute a separate instance of a console application for each logical partition, and permit a user to switch between the application instances to perform system administration operations on different logical partitions. In the alternative, a single console application may be configured to interact with multiple logical partitions via the multiple interfaces, and provide multiple displays on the display screen of the handheld computer. The multiple displays may be displayed concurrently, or in the alternative, may be capable of being toggled by a user in response to user input. Either variation of console application could be implemented by one of ordinary skill in the art having the benefit of the instant disclosure.

Once one or more console applications are executing on the handheld computer, a user then authenticates with each logical partition via the console applications, as illustrated in block 128. Next, various system administration operations are performed with each logical partition, as shown in block 130. As such, through the aforementioned configuration, multiple partitions may be managed in a concurrent or sequential manner.

As an alternative to using a plug-in module incorporating multiple network interfaces, multiple logical partitions may also be managed using multiple handheld computers and associated plug-in modules, with each plug-in module requiring only a single network interface. For example, as illustrated at 140 in FIG. 6, multiple logical partitions may be managed using multiple handheld computers by first inserting separate plug-in console emulation modules into each handheld computer, as shown in block 142. Next, as shown in block 144, Twinax-compatible cables may be attached between each handheld computer and each logical partition's workstation adapter on the multi-user computer. Thereafter, separate console applications are executed on each handheld computer, as shown in block 146. Then, the user may authenticate on each logical partition via the separate console applications, as shown at block 148. Thereafter, various system administration operations may be performed with each logical partition as shown in block 150, thereby permitting concurrent and/or sequential management of the multiple logical partitions.

It should be appreciated that, even in environments where multiple handheld computers and associated plug-in console emulation modules are used, due to the compact form factor of the handheld computers and the relative simplicity of the plugin modules, a more portable and cost-effective mechanism for managing multiple logical partitions on a multi-user computer is provided. As such, the herein-described implementations provide substantial advantages for service personnel, particularly in situations where a large number of partitions are supported on a multi-user computer, where a multi-user computer is installed in a location that is not amenable to the installation of dedicated terminals or workstations, or where cost, security, power consumption, heat dissipation and the like are a concern.

Moreover, while various alternative network interconnections may be utilized to interface a handheld computer with a multi-user computer consistent with the invention, through the use of a dedicated workstation interface as described herein, a user may be permitted to access a multi-user computer even when network problems exist, and the only way to access the computer is through a direct connection.

Various additional modifications will be apparent to one of ordinary skill in the art. Therefore, the invention lies in the claims hereinafter appended.

What is claimed is:

1. A method of managing a logical partition on a logically-partitioned computer, the method comprising:
    (a) connecting a handheld computer to an adapter on the logically-partitioned computer via a plug-in module coupled to the handheld computer and connected to the adapter via a cable; and
    (b) configuring the handheld computer to emulate a console for a logical partition in the logically-partitioned computer using program code resident in the plug-in module, wherein configuring the handheld computer to emulate the console includes automatically downloading the program code from the plug-in module to the handheld computer and initiating execution of the program code by the handheld computer in response to coupling the plug-in module to the handheld computer.

2. The method of claim 1, wherein the logically-partitioned computer comprises an AS/400-compatible midrange computer, and wherein the adapter comprises a workstation adapter allocated to the at least one logical partition.

3. The method of claim 1, wherein the program code is configured to control the handheld computer to emulate a 5250-compatible console that communicates with an AS/400-compatible midrange computer.

4. The method of claim 1, wherein connecting the handheld computer to the adapter comprises attaching the cable to the adapter and to a network interface on the plug-in module.

5. The method of claim 4, wherein the network interface comprises a Twinax-compatible interface suitable for communicating with an AS/400-compatible midrange computer.

6. The method of claim 1, further comprising authenticating with the logical partition via the emulated console.

7. The method of claim 1, further comprising performing a system administration operation on the logical partition via the emulated console.

8. The method of claim 7, further comprising performing a second system administration operation on a second logical partition in the logically-partitioned computer.

9. The method of claim 8, wherein the first adapter is allocated to the first logical partition, and wherein the logically-partitioned computer includes a second adapter allocated to the second logical partition, the method further comprising, after performing the first system administration operation, disconnecting the cable from the first adapter and connecting the cable to the second adapter, wherein performing the second system administration operation is performed via the handheld computer and plug-in module interacting with the second logical partition through the second adapter.

10. The method of claim 8, wherein the first adapter is allocated to the first logical partition, wherein the logically-partitioned computer includes a second adapter allocated to the second logical partition, wherein the plug-in module includes first and second network interfaces, wherein the first cable is coupled to the first network interface, the method further comprising, prior to performing the second system administration operation, connecting a second cable between the second adapter and the second network interface, wherein performing the second system administration operation is performed via the handheld computer and plug-in module interacting with the second logical partition through the second adapter, and while the first cable is coupled between the first adapter and first network interface.

11. The method of claim 8, wherein the first adapter is allocated to the first logical partition, wherein the logically-partitioned computer includes a second adapter allocated to the second logical partition, the method further comprising:
  (a) connecting a second handheld computer to the second adapter via a second plug-in module coupled to the second handheld computer; and
  (b) configuring the second handheld computer to emulate a second console for the second logical partition in the logically-partitioned computer using program code resident in the second plug-in module.

12. The method of claim 8, further comprising performing the first and second system administration operations while a user is concurrently authenticated to the first and second logical partitions.

13. The method of claim 8, wherein the first adapter is allocated to the first logical partition, wherein the logically-partitioned computer includes a second adapter allocated to the second logical partition, wherein the plug-in module includes first and second network interfaces, wherein the first cable is coupled to the first network interface, the method further comprising:
  (a) connecting a second cable between the second adapter and the second network interface;
  (b) authenticating a user with each of the first and second logical partitions via the plug-in module while the first and second cables are coupled respectively between the first and second adapters and the first and second interfaces, wherein the first and second system administration operations are performed while the user is concurrently authenticated to the first and second logical partitions.

14. A computer system, comprising:
  (a) a logically-partitioned computer including a plurality of logical partitions;
  (b) an adapter coupled to the logically-partitioned computer and configured to access at least one of the plurality of logical partitions; and
  (c) a handheld computer coupled to the adapter via a plug-in module coupled to the handheld computer and connected to the adapter via a cable, wherein the plug-in module includes program code configured to be automatically downloaded from the plug-in module to the handheld computer and executed by the handheld computer when the plug-in module is coupled to the handheld computer to control the handheld computer to emulate a console for the at least one logical partition.

15. A plug-in module for a handheld computer, comprising:
  (a) a network interface configured to receive a network connector;
  (b) a memory; and
  (c) program code resident in the memory and configured to be automatically downloaded from the memory to a handheld computer and executed by the handheld computer when the plug-in module is coupled to the handheld computer to control the handheld computer to emulate a console that communicates with a multi-user computer over the network interface.

16. The module of claim 15, wherein the network interface comprises a twinaxial interface, and wherein the network connector comprises a twinaxial connector.

17. The module of claim 16, wherein the network interface comprises a Twinax-compatible interface suitable for communicating with an AS/400-compatible midrange computer, and wherein the network connector comprises a Twinax-compatible connector.

18. The module of claim 15, wherein the program code is configured to control the handheld computer to emulate a 5250-compatible console that communicates with an AS/400-compatible midrange computer.

19. The module of claim 15, wherein the program code is configured to control the handheld computer to emulate a console that communicates with a logical partition in a logically-partitioned multi-user computer.

20. The module of claim 15, further comprising a second network interface configured to receive a second network connector.

21. The module of claim 20, wherein the program code is configured to control the handheld computer to emulate first and second consoles that respectively communicate with first and second logical partitions in a logically-partitioned multi-user computer over the first and second network interfaces.

22. An apparatus, comprising:
  (a) a handheld computer including a module interface; and
  (b) a plug-in module coupled to the module interface of the handheld computer, the plug-in module including a network interface configured to receive a network connector, a memory, and program code resident in the memory and configured to be automatically downloaded from the plug-in module to the handheld computer and executed by the handheld computer when the plug-in module is coupled to the handheld computer to control the handheld computer to emulate a console that communicates with a multi-user computer over the network interface.

* * * * *